Feb. 27, 1923.
J. H. PARSONS
1,446,657
CLUTCH
Filed Apr. 22, 1920
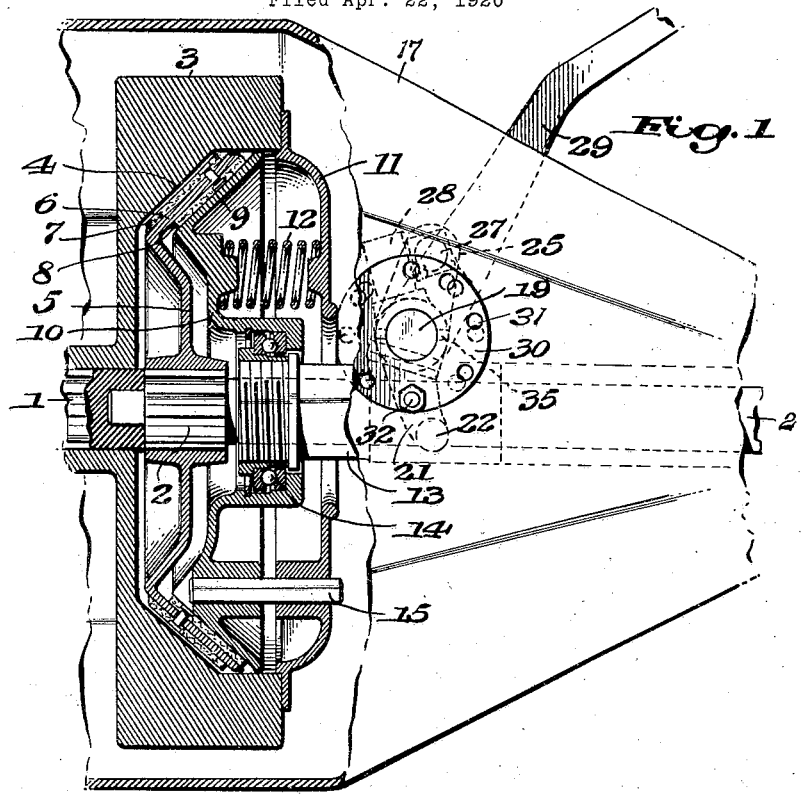
Fig.1
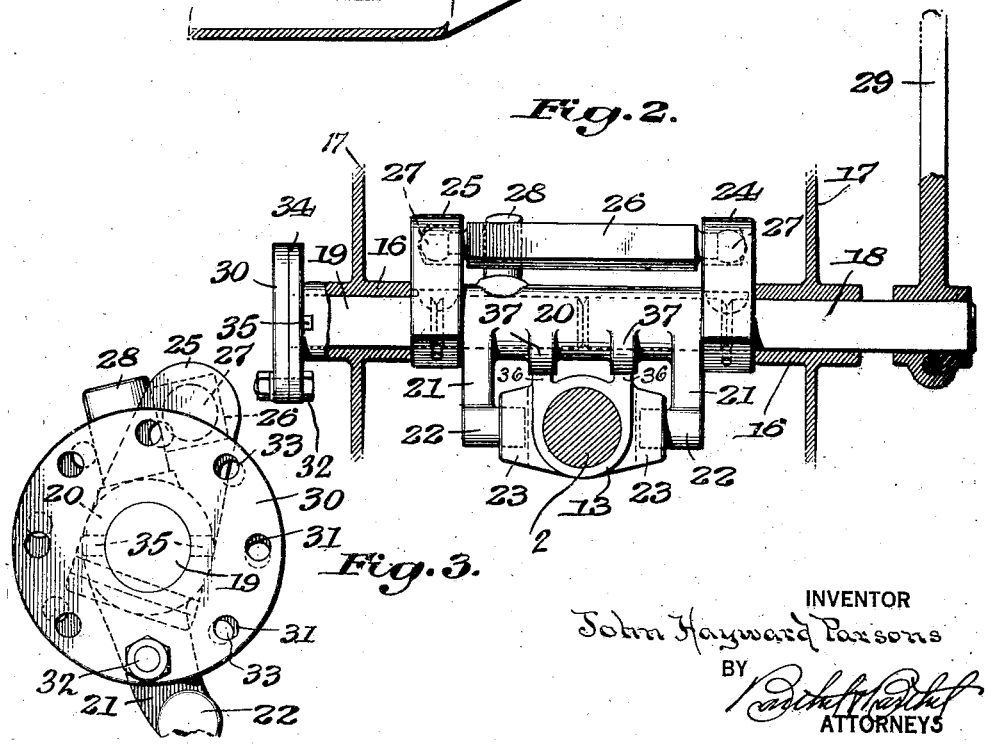
Fig.2.
Fig.3.
INVENTOR
John Hayward Parsons
BY
ATTORNEYS Patented Feb. 27, 1923.

1,446,657

UNITED STATES PATENT OFFICE.

JOHN HAYWARD PARSONS, OF FERNDALE, MICHIGAN, ASSIGNOR OF ONE-HALF TO OTTO FRED POELKE, JR., OF DETROIT, MICHIGAN.

CLUTCH.

Application filed April 22, 1920. Serial No. 375,677.

*To all whom it may concern:*

Be it known that I, JOHN HAYWARD PARSONS, a citizen of the United States of America, residing at Ferndale, in the county of Oakland and State of Michigan, have invented certain new and useful Improvements in Clutches, of which the following is a specification, reference being had therein to the accompanying drawings.

This invention relates to devices known as clutches and more particularly to clutches especially adapted for transmitting power from the crank shaft of an engine to an aligned driven shaft. An object of the invention is to provide a simplified and efficient construction which is compact in arrangement and which is so constructed and arranged as to obviate the requirement for adjustment as the friction surfaces wear away in use.

A further object is to provide a simple and compact lever arrangement for operating the clutch, whereby the operator may operate the clutch with comparative ease, thus permitting of the use of a comparatively stiff spring or springs for holding the clutch engaged and thus eliminating the necessity for adjustment of the friction members as they are worn away in use. Another object of the invention is to provide means whereby the position of an operating foot pedal may be readily adjusted and to provide certain other new and useful features in the construction and arrangement of parts.

With the above and other ends in view, the invention consists in the matters hereinafter set forth and more particularly pointed out in the appended claims, reference being had to the accompanying drawing in which—

Figure 1 is a longitudinal section through an engine fly-wheel and clutch mechanism, illustrative of features of the invention and showing a portion of a fly-wheel casing in elevation with clutch operating mechanism supported thereon and shown partly in dotted lines;

Fig. 2 is a detail view of the clutch operating mechanism; and

Fig. 3 is an end elevation of Fig. 2.

As shown in the drawing, 1 indicates an end of a driving shaft which in the motor vehicle construction shown, is the crank shaft of the motor, and 2 is a driven shaft arranged in longitudinal axial alignment with the driving shaft to rotate independently thereof and to which motion is transmitted by the clutch comprising the fly wheel 3 secured upon the driving shaft to turn therewith and cupped or internally recessed to provide an inclined annular friction surface 4 to be engaged by a cone-shaped driven friction member 5 which is secured to the driven shaft to turn therewith and to slide longitudinally thereon. This friction member 5 is formed with an annular rim portion 6 which is inclined or angularly formed to correspond to the inclination of the friction surface 4 on the fly wheel and secured upon the opposite surfaces of this portion 6 are friction linings 7 and 8 or strips of suitable fibrous or other friction material, the lining 7 being provided to engage the surface 4 of the fly wheel and the lining 8, to engage the conical rim portion 9 of a follower member 10 which is interposed between the driven friction member 5 within the fly wheel and a casing or cover 11 bolted or otherwise secured at its periphery to the rear edge of the fly-wheel. Interposed between the follower member 10 and the cover 11, is any desired number of coiled springs 12 which normally exert a pressure to force the follower into frictional contact with the driven friction member 5 and move said member into frictional contact with the surface 4 of the fly wheel. The member 5 is thus clamped at its rim portion between the fly wheel and follower to frictionally drive said driven member and through its driving engagement with the driven shaft 2, transmit motion from the driving to the driven shafts. By cupping the fly wheel and correspondingly inclining the friction surfaces of the follower and driven members, extended friction surfaces are secured without the necessity for increasing the outside diameter of the fly wheel, the inclination of the several surfaces being such that they will not wedge, one within the other, but will readily release or separate when the pressure of the springs 12 is removed by moving the follower member longitudinally of the shafts against the action of said springs.

To so move said follower member against the action of said springs, a sleeve 13 is provided upon the driven shaft 2 and extends into the open side of the fly wheel through an axial opening in the plate 11, a suitable thrust bearing 14 being mounted upon the inner end of the sleeve in the usual manner to connect the sleeve with the follower and permit of a free relative rotation of the sleeve and follower. The follower is rigidly connected to and guided in its movement toward and from the cover 11 by means of a pin or pins 15 on the follower engaging bearing openings therefor in the cover and through which openings the pins are free to slide as the follower is moved toward or from the cover.

In this construction, the friction members and power springs are all substantially housed within the fly wheel, the cover 11 forming a closure for the open side of the wheel, with only the driven shaft and operating sleeve 13 projecting from the housing thus formed.

The arrangement is also such that the minimum of space in length is required and the outside diameter of the clutch mechanism is reduced by the conical form of the friction members.

Lever mechanism for moving the sleeve 13 endwise on its shaft and thus operating the clutch, is shown in detail in Figs. 2 and 3, this mechanism comprising a transverse shaft mounted in bearings 16 on opposite sides of a fly wheel casing 17 which is extended rearwardly from over the fly wheel, said shaft being in two axially aligned parts 18 and 19 with their inner ends in abutting relation, and a sleeve 20 slipped over and free to turn upon said ends above said driven shaft 2, the said sleeve being provided with arms 21 adjacent its ends and the free ends of said arms being formed with laterally extending studs 22 adapted to engage laterally extending lugs 23 on opposite sides of the sleeve 13. Keyed or otherwise rigidly secured to the shaft part 18 adjacent one end of the sleeve 20, is an arm 24, and a like arm 25 is keyed to the other shaft part 19 adjacent the opposite end of said sleeve 20. These arms 24 and 25 are connected at their free ends by a bar 26 having a ball head 27 at each end engaged within a socket in each arm to provide a loose connection of each end of said bar to each arm and projecting laterally from the sleeve 20 in a direction opposite to that in which the arms 21 thereon extend, is a stud 28 adjacent the arm 25 on the shaft part 19, said stud being adapted to be engaged at one side by one side of the bar 26. To turn the shaft part 18, a lever 29 which may be a foot pedal, is secured to the outer end thereof and the shaft part 19 is held against turning by a plate 30 on its extreme outer end having a series of holes 31 near its periphery to receive a bolt 32 adapted to engage similar holes 33 in a disk 34 which is provided with laterally extending ribs or lugs 35 to engage notches in the end of the bearing 16 for the shaft. The shaft 19 is thus held against turning by the engagement of the lugs 35 in the notches of the fixed bearing and the attachment of the end plate 30 on the shaft to this plate 34. The series of holes 31 in the disk 30 do not exactly align with the holes 33 in the disk 34, that is, the spacing of the holes in one disk is slightly different from the spacing of the holes in the other disk and thus by adjusting the bolt 32 from one hole to another, the relative position of the disks is changed by bringing the particular holes through which the bolt is inserted, into coincidence. This adjustment of the disk 30 relative to the disk 34, adjusts the position of the shaft part 19 and arm 25 thereon which adjustment will in turn adjust the position of the pedal 29.

The sleeve 13 is free to turn upon the shaft 2 and to prevent such turning movement so that the studs 22 on the arms 21 will properly engage the ears 23 of said sleeve, this sleeve is formed with spaced parallel longitudinal ribs 36 which are engaged by suitable projections 37 on the sleeve 20. As the sleeve 20 extends transversely of the sleeve 13 and is carried by the shafts 18 and 19 mounted in bearings on the casing, the engagement of the projections 37 thereon with the spaced ribs 36 on the sleeve 13 will prevent said latter sleeve from rotating upon its shaft but permits its free longitudinal movement and also a limited oscillatory movement of the sleeve 20.

In operation, when the driver presses forward upon the pedal 29, the shaft part 18 is turned, turning the arm 24 thereon and carrying the end of the lever bar 26 which is connected thereto, forwardly. This forward swinging movement of said bar will turn the sleeve 20 by reason of the engagement of the forward side of the bar with the stud 28 on said sleeve, the bar being fulcrumed on the arm 25, and as said bar engages the stud adjacent its fulcrum, the leverage of the foot pedal 29 in turning the sleeve is greatly increased thereby over a direct connection of the pedal to the sleeve, such as would be the case if the sleeve 20 were secured upon the shaft 18. The turning of said sleeve 20 swings the arms 21 thereon rearwardly against the ears 23 on the sleeve 13 and thus slides said sleeve longitudinally upon the shaft 2 against the action of the springs 12 within the clutch proper. The sleeve 13 by reason of its loose connection with the follower member 10 will move said member longitudinally against the action of said springs 12 and thus relieve the driven friction member 5 from frictional engagement with said follower and fly wheel, permitting a free turning movement of the fly-wheel independently of the driven member and driven shaft and stopping the transmission of motion to said shaft. Upon release of the foot pedal 29 the springs 12 at once act to move the follower member toward the fly wheel, clamping the driven member therebetween and frictionally holding the driven member to turn with the driving shaft and fly wheel.

By the arrangement of friction members within the fly wheel and the closing of the open side of the fly wheel by the plate 11 which forms an abutment for the springs 12, said members and springs are all housed within the fly wheel and a very compact construction secured which takes up but little space in length and makes this device particularly adapted to motor vehicle constructions.

Further, by making the friction members of conical form, an extended friction surface is secured without the necessity for increasing the over-all diameter of the fly wheel.

The arrangement of the lever bar 26 increases the leverage of the foot pedal so that the clutch may be operated thereby without undue exertion on the part of the operator and this leverage may be such that heavy springs for holding the friction members engaged may be employed, thereby obviating slippage and also the necessity for providing means for adjusting the tension of the springs. The construction and arrangement of the lever mechanism for operating the clutch is also simple and compact, taking up a minimum space and affording an adequate increase of power by simple means not liable to get out of order.

The arrangement also provides simple and adequate means whereby the position of the pedal 29 may be quickly adjusted as desired, it being only necessary to remove the single bolt 32 and insert it in another of the pairs of holes provided therefor in the plates 30 and 34, the disalignment of the holes of each pair providing any desired degree of adjustment.

Having thus fully described my invention, what I claim is:—

1. In a clutch, the combination with friction members, yieldable means for normally holding said friction members in frictional contact, of means for moving one of said friction members against the action of said yieldable means comprising a longitudinally movable member operatively connected at one end with one of said friction members to move the same against the action of said yieldable means, an oscillatory member extending transversely of said longitudinally movable member and having radially and oppositely extending portions, one to engage and move the longitudinally movable member, a lever member supported adjacent the oscillatory member and adapted to engage intermediate its ends, the other of said radially extending portions on said oscillatory member, and means for swinging said lever member toward said radially extending portion on the oscillatory member to oscillate said member.

2. In a clutch, the combination with friction members and a longitudinally movable member for operating said friction members, of a pivoted lever bar horizontally disposed above and transversely of said longitudinally movable member, means engaging said lever bar adjacent its pivoted end for moving the longitudinally movable member, and means operable in a vertical plane for swinging said lever bar.

3. In a clutch, the combination with friction members and a longitudinally movable member for operating said friction members, of an oscillatory member for moving the longitudinally movable member, a stud on the oscillatory member, a lever bar pivotally supported at one end adjacent said stud and engaging said stud intermediate the stud ends, and means swingable in a vertical plane and engaging the opposite end of said lever bar for operating the same.

4. In a clutch, the combination with friction members and a longitudinally movable member for operating the friction members, of an oscillatory member having a laterally extending stud and arranged transversely of said longitudinally movable member to engage and operate the same, a lever bar extending longitudinally of said oscillatory member and engaging said stud intermediate the ends of said stud, a support to which one end of the lever bar is pivotally attached, an oscillatory member to which the opposite end of the lever bar is pivotally attached, and means for oscillating the last-mentioned member to swing said lever bar.

5. In a clutch, the combination with friction members and a longitudinally movable sleeve for operating one of the friction members, of a shaft extending transversely of said sleeve, an oscillatory sleeve on said shaft having operative connection with said longitudinally movable sleeve to move the same longitudinally, a stud on the oscillatory sleeve, a support adjacent one end of the oscillatory sleeve, a lever pivotally attached at one end to said support and engaging said stud, an arm on the shaft to which the opposite end of said lever is pivotally attached, and means for turning the shaft.

6. In a clutch, the combination with a driving and a driven shaft, friction members on said shafts, and yieldable means for holding said friction members in frictional engagement, of an operating sleeve on the driven shaft having operative connection with one of the friction members to move the same against the action of said yieldable means upon longitudinal movement of said sleeve, a two-part shaft arranged transversely of said operating sleeve, an oscillatory sleeve on the two-part shaft and provided with radially extending arms to engage and move the operating sleeve, a radially extending stud on the oscillatory sleeve, a lever bar extending longitudinally of said oscillatory sleeve to engage said stud adjacent one end of said lever bar, means for adjustably holding one shaft part against turning, an arm on said shaft part to which arm one end of the lever is pivotally attached, an arm on the other shaft part to which the opposite end of the lever bar is pivotally attached, and means for rotating the last mentioned shaft part.

In testimony whereof I affix my signature in the presence of two witnesses.

JOHN HAYWARD PARSONS.

Witnesses:—
ANNA M. DORR,
CHAS. W. STAUFFEGER.